United States Patent
Taylor et al.

(10) Patent No.: US 8,008,405 B2
(45) Date of Patent: Aug. 30, 2011

(54) METHOD OF STABILIZING METAL PIGMENTS AGAINST GASSING

(75) Inventors: Cathy A. Taylor, Allison Park, PA (US); Daniel Rardon, Pittsburgh, PA (US); Paul Lamers, Allison Park, PA (US); Kapiappa G. Ragunathan, Gibsonia, PA (US); Shanti Swarup, Allison Park, PA (US); Michael Hart, Cleveland Heights, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 230 days.

(21) Appl. No.: 12/190,279

(22) Filed: Aug. 12, 2008

(65) Prior Publication Data

US 2008/0306241 A1   Dec. 11, 2008

Related U.S. Application Data

(62) Division of application No. 11/120,228, filed on May 2, 2005, now Pat. No. 7,462,394.

(60) Provisional application No. 60/569,307, filed on May 6, 2004.

(51) Int. Cl.
*C08G 59/14* (2006.01)
*C08G 63/685* (2006.01)
*C08G 63/692* (2006.01)

(52) U.S. Cl. .............. 525/327.3; 525/340; 525/377; 525/523; 525/533; 528/99; 528/108; 528/114; 528/287; 528/398; 528/407

(58) Field of Classification Search .................. None
See application file for complete search history.

(56) References Cited

U.S. PATENT DOCUMENTS

| | | | | |
|---|---|---|---|---|
| 3,375,220 | A * | 3/1968 | Clark et al. | 524/712 |
| 4,271,276 | A * | 6/1981 | Makarova et al. | 525/340 |
| 4,497,946 | A * | 2/1985 | Sekmakas et al. | 528/99 |
| 4,576,902 | A * | 3/1986 | Saenger et al. | 430/326 |
| 6,267,952 | B1 * | 7/2001 | Mandeville et al. | 424/78.08 |

* cited by examiner

*Primary Examiner* — David Buttner
(74) *Attorney, Agent, or Firm* — Steven W. Hays

(57) ABSTRACT

The present invention is directed to a passivating material suitable for passivating a metal surface. The passivating material comprises a polymer which comprises (a) at least one nitro group, and/or pyridine group, and/or phenolic hydroxyl group; and (b) at least one group selected from a phosphorous-containing group and/or a carboxylic acid group, wherein the at least one phosphorous-containing group is selected from a phosphate, a phosphite, or a non-nitrogen substituted phosphonate.

12 Claims, No Drawings

METHOD OF STABILIZING METAL PIGMENTS AGAINST GASSING

CROSS REFERENCE TO RELATED APPLICATIONS

This application is a divisional of U.S. patent application Ser. No. 11/120,228 filed May 2, 2005, now U.S. Pat. No. 7,462,394 which claims the benefit of U.S. Provisional Application No. 60/569,307 filed May 6, 2004.

FIELD OF THE INVENTION

The present invention is related to polymeric compounds useful as a combined corrosion or hydrolysis inhibitor and surface modifier for metallic flake pigment. The invention also pertains to coating compositions containing the treated metallic pigments.

BACKGROUND OF THE INVENTION

The use of metallic flake pigments, such as aluminum flake pigments, in decorative coatings to give the coating a metallic effect is widespread. The metallic effect is particularly popular with customers in the automotive market where "glamour finishes" are desired.

Automotive coatings can utilize a single, uniformly pigmented layer. Alternatively, they can have two distinct layers, i.e., a first, highly pigmented layer (basecoat) and a subsequently applied coating layer with little or no pigmentation (clearcoat). The two-layer coating is known in the industry as "basecoat/clearcoat". Basecoat/clearcoat coatings impart a high level of gloss and depth of color that can result in a particularly appealing look. Metallic flake pigments typically are incorporated into the basecoat composition.

Waterborne automotive paints are gaining widespread usage in the automotive industry due to concerns over organic solvent emissions during coating application and curing processes. However, waterborne paints have the disadvantage of using a medium that can be corrosive to metallic flake pigments. For example, hydrolysis of the metal pigments can occur in waterborne paints. Additionally, the pH of typical waterborne acrylic coating compositions can range from 8.0 to 9.0, and typical polyurethane coating compositions can have a pH typically ranging from 7.5 to 8.0. In a basic pH environment, the aluminum pigment can be oxidized. The oxidation is a form of corrosion that destroys the metallic pigmentation properties of the mirror-like particles. When a paint with oxidized metallic flake pigments is coated onto a substrate, the coating shows discoloration and diminished metallic effect.

Additionally, the hydrolysis or oxidation of the metallic surfaces in waterborne paints results in the evolution of hydrogen gas. The amount of hydrogen gas evolved is indicative of the amount of oxidation (i.e., corrosion) of the metallic pigment. The hydrogen gas can accumulate under pressure if the coating composition is stored in a closed container.

Hydrolysis of aluminum pigment in the presence of water can accelerate over time due to continuous contact with the basic pH environment of the coating composition. Coating compositions containing metal flake pigment are often stored for 6 months or more before application, which can result in significant corrosion of the pigment. If this corrosion remains unchecked the coating composition can be rendered unusable.

Considerable work has been done in the industry to treat or "passivate" metal pigment surfaces to prevent corrosion of the metal surface by water in waterborne coating compositions. For example, it is known to apply a chrome coating over aluminum pigment surfaces to prevent the corrosion and hydrogen generation described above. However, chrome can be toxic and, therefore, special handling and disposal procedures are required for such chrome coated metallic pigment particles.

Therefore, it would be advantageous to provide a coating composition that could be used to passivate metal pigments while reducing or eliminating altogether at least some of the problems associated with known passivation procedures.

SUMMARY OF THE INVENTION

In one embodiment, the present invention is directed to a polymer suitable for passivating a metal surface. The polymer comprises (a) at least one nitro group, and/or pyridine group, and/or phenolic hydroxyl group; and (b) at least one group selected from a phosphorous-containing group and/or a carboxylic acid group, wherein the at least one phosphorous-containing group is selected from a phosphate, a phosphite, or a non-nitrogen substituted phosphonate.

Also, the present invention provides a passivated metal pigment comprising at least one metal pigment particle and a passivating material formed over at least a portion of the at least one pigment particle. The passivating material can comprise a polymer comprising (a) at least one nitro group, and/or pyridine group, and/or phenolic hydroxyl group; and (b) at least one group selected from a phosphorous-containing group and/or a carboxylic acid group, wherein the at least one phosphorous-containing group is selected from a phosphate, a phosphite, or a non-nitrogen substituted phosphonate.

In a further embodiment, the present invention is directed to a coating composition which comprises a diluent medium, a film-forming polymer, and at least one metal pigment particle at least partly treated with a passivating material. The passivating material can comprise a polymer comprising (a) at least one nitro group, and/or pyridine group, and/or phenolic hydroxyl group; and (b) at least one group selected from a phosphorous-containing group and/or a carboxylic acid group, wherein the at least one phosphorous-containing group is selected from a phosphate, a phosphite, or a non-nitrogen substituted phosphonate.

Another embodiment provides a coating composition which comprises an aqueous diluent medium, a film-forming polymer, and at least one metal pigment particle at least partly treated with a passivating material. The passivating material can comprise a polymer comprising the reaction product of a diglycidyl ether of a polyhydric alcohol; a nitro group-containing compound selected from at least one of an alkyl, an aryl, and/or an alkyl aryl nitro group-containing compound; and a phosphorous group-containing compound comprising a phosphate group and/or a non-nitrogen substituted phosphonate group.

A method of passivating a metal surface that comprises contacting the metal surface with a passivating material is also provided. The passivating material comprises a polymer comprising (a) at least one nitro group, and/or pyridine group, and/or phenolic hydroxyl group; and (b) at least one group selected from a phosphorous-containing group and/or a carboxylic acid group, wherein the at least one phosphorous-containing group is selected from a phosphate, a phosphite, or a non-nitrogen substituted phosphonate.

DESCRIPTION OF THE INVENTION

As used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims are approximations that may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to include the beginning and ending range values and to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10, 3.7 to 6.4, or 1 to 7.8, just to illustrate a few. Molecular weight quantities used herein, whether Mn or Mw, are those determinable from gel permeation chromatography using polystyrene as a standard. Also, as used herein, the term "polymer" includes oligomers, homopolymers, and copolymers. The terms "surface modification" and "surface modified" encompass any and all associations, interactions, or reactions between a metallic surface and a compound or composition in accordance with the disclosed invention. The terms "passivate" and "passivation" refer to a surface that has been modified to reduce the tendency of the surface to corrode and/or to generate hydrogen gas upon contact with water. All references referred to in this document are to be understood to be incorporated by reference in their entirety. As used herein, the phrase "non-nitrogen substituted phosphonate" means a group having the formula:

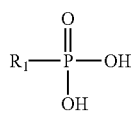

(I)

where $R_1$ is any group that does not contain nitrogen.

The passivating materials useful in the present invention generally comprise a polymer having at least two substituents. In one non-limiting embodiment, a first substituent can comprise at least one nitro group, and/or at least one pyridine group, and/or at least one phenolic hydroxyl group. A second substituent can comprise at least one phosphorous-containing group and/or at least one carboxylic acid group.

In the broad practice of the invention, the passivating polymer can be a straight chain or branched polymer. The polymer can be or can be derived from, for example, an acrylic polymer, a polyester polymer, a polyurethane polymer, an epoxy polymer, a polyolefin polymer, a polyether polymer, or can be a copolymer containing one or more of the above. In one embodiment, the polymer can be or can be derived from a hydroxyl group- or an epoxy group-containing polymer including addition and condensation polymers, or mixtures of such polymers can also be used. The polymer can have a hydroxyl equivalent weight ranging from 100 to 1000, such as 200 to 400; or an epoxy equivalent weight ranging from 100 to 2000, such as 300 to 600.

Examples of hydroxyl group-containing polymers that can be utilized include, but are not limited to, hydroxyl group-containing condensation polymers, such as hydroxyl functional polyesters. Examples of epoxy group-containing polymers that can be utilized include polyglycidyl ethers of polyhydric alcohols such as the reaction products of epichlorohydrin or dichlorohydrin with aliphatic and cycloaliphatic alcohols, such as ethylene glycol, diethylene glycol, triethylene glycol, propylene glycol, dipropylene glycol, tripropylene glycol, propane diols, butane diols, pentane diols, glycerol, 1,2,6-hexanetriol, pentaerythritol, and 2,2-bis(4-hydroxycyclohexyl)propane.

Examples of hydroxyl or epoxy group-containing addition polymers that can be utilized include hydroxyl or epoxy functional polymers or copolymers of ethylenically unsaturated monomers. Examples of suitable monomers with hydroxyl functionality include hydroxyethyl (meth)acrylate, hydroxypropyl (meth)acrylate, hydroxybutyl (meth)acrylate, and allyl alcohol. Examples of suitable monomers with epoxy functionality include glycidyl (meth)acrylate. The addition polymer can be a homopolymer of any of these hydroxyl or epoxy functional monomers or can be a copolymer of one or more of these hydroxyl or epoxy functional monomers and at least one other ethylenically unsaturated monomer that is not hydroxyl or epoxy functional. Examples of these other monomers include but are not limited to methyl (meth)acrylate, ethyl (meth)acrylate, butyl (meth)acrylate, styrene, and vinyl monomers such as styrene, vinyl toluene and vinyl acetate.

Examples of epoxy compounds that can be utilized include compounds as simple as ethylene oxide, propylene oxide, butylene oxide, cyclohexene oxide, and the like.

Examples of epoxy compounds that can be utilized also include the epoxy polyethers obtained by reacting an epihalohydrin (such as epichlorohydrin or epibromohydrin) with a polyphenol in the presence of an alkali. Suitable polyphenols include: 2,2-bis(4-hydroxyphenyl)propane (i.e., bisphenol-A), 1,1-bis(4-hydroxyphenyl)isobutane, 2,2-bis(4-hydroxytertiarybutylphenyl)propane, 4,4-dihydroxybenzophenone, 1,1-bis(4-hydroxyphenyl)ethane, bis(2-hydroxynaphthyl)methane, 1,5-dihydroxynaphthalene, 1,1-bis(4-hydroxy-3-allylphenyl)ethane, and the hydrogenated derivatives of such compounds. The polyglycidyl ethers of polyphenols of various molecular weights can be produced, for example, by varying the mole ratio of epichlorohydrin to polyphenol in known manner.

Examples of epoxy compounds that can be utilized also include the polyglycidyl ethers of mononuclear polyhydric phenols such as the polyglycidyl ethers of resorcinol, pyrogallol, hydroquinone, and pyrocatechol, as well as the monoglycidyl ethers of monohydric phenols such as phenylglycidyl ether, alpha-naphthylglycidyl ether, beta-naphthylglycidyl ether, and the corresponding compounds bearing an alkyl substituent on the aromatic ring.

Further non-limiting examples of epoxy compounds that can be utilized also include the glycidyl ethers of aromatic alcohols, such as benzylglycidyl ether and phenylglycidyl ether, or the polyglycidyl ethers of polyhydric alcohols such as the reaction products of epichlorohydrin or dichlorohydrin with aliphatic and cycloaliphatic alcohols such as ethylene glycol, diethylene glycol, triethylene glycol, dipropylene glycol, tripropylene glycol, propane diols, butane diols, pentane diols, glycerol, 1,2,6-hexanetriol, pentaerythritol and 2,2-bis(4-hydroxycyclohexyl)propane.

More non-limiting examples of epoxy compounds that can be utilized also include polyglycidyl esters of polycarboxylic acids such as the generally known polyglycidyl esters of adipic acid, phthalic acid, and the like. Other epoxy compounds that can be utilized include the monoglycidyl esters of monocarboxylic acids, such as glycidyl benzoate, glycidyl naphthoate as well as the monoglycidyl esters of substituted benzoic acid and naphthoic acids.

Addition polymerized resins containing epoxy groups can also be employed. Such materials can be produced by the addition polymerization of epoxy functional monomers such as glycidyl acrylate, glycidyl methacrylate and allyl glycidyl ether typically in combination with polymerizable ethylenically unsaturated and/or vinyl monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate, hydroxyethyl acrylate, hydroxyethyl methacrylate, 2-ethylhexyl acrylate, 2-ethylhexyl methacrylate, isobornyl methacrylate, and the like.

Alternatively, the polymeric backbone can comprise an acrylic, urethane, polyester, alkyd or epoxy polymer or oligomer. The polymeric backbone when synthesized can include thereon at least two isocyanate groups or capped or blocked isocyanate groups. This can be accomplished by either copolymerizing into the polymeric backbone a monomer with isocyanate or blocked isocyanate functionality, or by reacting one or more groups (e.g., hydroxyl or amino groups) with isocyanate or blocked isocyanate functionality onto the polymer. The reaction of the isocyanate or blocked isocyanate functionality with an isocyanate-reactive functionality of the first substituent or the second substituent can form the appropriate linking group.

Illustrative examples of isocyanate or blocked isocyanate functional urethane backbones include urethane polymers with terminal isocyanate or blocked isocyanate functionality. The urethane polymers can be synthesized by known techniques, such as bulk polymerization, such as solution polymerization, from polyisocyanates and polyfunctional compounds reactive with polyisocyanates, including, for example, polyols, polyamines, and amino alcohols; with the proviso that the sum of equivalents of isocyanate and latent isocyanate groups used exceeds the equivalents used of polyfunctional compounds reactive with polyisocyanates. The polyisocyanate can be, for example, isophorone diisocyanate, p-phenylene diisocyanate, biphenyl 4,4' diisocyanate, metaxylylene diisocyanate, toluene diisocyanate, 3,3'-dimethyl-4,4'-biphenylene diisocyanate, 1,4-tetramethylene diisocyanate, 1,6-hexamethylene diisocyanate, 2,2,4-trimethylhexane-1,6-diisocyanate, 1,3-bis-[2-((isocyanato)propyl]benzene (also known as tetramethylxylyldiisocyanate, TMXDI) methylene bis-(phenyl isocyanate), 1,5-naphthalene diisocyanate, bis-(isocyanatoethyl fumarate), methylene bis-(4-cyclohexyl isocyanate), and biurets or isocyanurates of any of these.

The polyfunctional compounds reactive with polyisocyanates can include any of diols, triols, or alcohols of higher functionality, such as ethylene glycol, propylene glycol, 1,4-butanediol, 1,6-hexanediol, neopentyl glycol, trimethylolethane, trimethylolpropane, pentaerythritol, polyester polyols, polyether polyols, and the like; polyamines, such as ethylene diamine and diethylene triamine; or amino alcohols, such as diethanolamine and ethanolamine.

One of either the polyisocyanate or the polyfunctional compound reactive with polyisocyanate can have functionality (including blocked functionality) greater than two. The reactants can be apportioned so that the polyurethane copolymer has terminal isocyanate functionality.

Illustrative examples of isocyanate or blocked isocyanate functional acrylics are copolymers of an ethylenically unsaturated monomer containing an isocyanate or blocked isocyanate group. The copolymers can be prepared by using conventional techniques, such as free radical polymerization cationic polymerization, or anionic polymerization, in, for example, a batch or semi-batch process. For instance, the polymerization can be carried out by heating the ethylenically unsaturated monomers in bulk or in organic solution in the presence of a free radical source, such as an organic peroxide or azo compound and, optionally, a chain transfer agent for a batch process; or, alternatively, the monomers and initiator(s) can be fed into the heated reactor at a controlled rate in a semi-batch process.

In one non-limiting embodiment, the first substituent can comprise a nitro ($NO_2$) group. The nitro substituent can be formed by reacting a nitro-containing material with isocyanate groups on the polymer backbone. Examples of such materials useful for forming the substituents compatible with the above-mentioned requirements include any nitro-containing compound having an isocyanate reactive group, such as hydroxy, amino, mercapto or oxirane group. Useful nitro-containing compounds include alkyl, aryl, or alkylaryl substituted compounds including an isocyanate reactive group. Exemplary, non-limiting nitro-containing compounds for purposes of the present invention include 2-methyl-2-nitro propanol, 2-nitro-1-propanol, 2-nitroethanol, 4-nitroaniline, 2-nitrobenzyl alcohol, 4-nitrothiophenol, 2-nitrobenzoic acid, 4-nitrobenzoic acid, 2-4-dinitrobenzoic acid, and/or mixtures thereof.

In another non-limiting embodiment, the first substituent can comprise at least one pyridine group and/or at least one phenolic hydroxyl group. Examples of materials suitable for forming the pyridine group include, but are not limited to, 2,6 pyridine dimethanol, 2-pyridine propanol, 3-pyridine propanol, pyridine proprionic acid, isonicotonic acid, picolinic acid, dipicolinic acid, nicotinic acid, dinicotinic acid, cinchomeronic acid, isocinchomeronic acid, or mixtures thereof. Examples of materials suitable for forming the phenolic hydroxyl group include, but are not limited to, gallic acid, allyl phenol, polyhydroxy phenols, such as resorcinol, catechol, phloroglucinol, pyrogallol, 1,2,4-benzene triol, or mixtures thereof.

In one non-limiting embodiment, the second substituent comprises a phosphorous-containing group, such as a phosphate group, a non-nitrogen substituted phosphonate group, orthophosphoric acid, an organic ester of phosphoric acid, and/or a phosphite compound. For example, the phosphate compound can be of the type described in U.S. Pat. No. 4,565,716. Organic phosphites are derivatives of phosphorous acid, rather than phosphoric acid used to produce organic phosphates. Exemplary organic phosphates are described in U.S. Pat. No. 4,808,231.

Examples of phosphoric acid esters that can be used in the practice of the invention include mono- and di-$C_4$-$C_{18}$ alkyl esters, such as mono- and dibutylphosphate, mono and dipentyl phosphate, mono- and dihexylphosphate, mono- and diheptylphosphate, mono- and dioctylphosphate, mono- and dinonylphosphate, mono- and dihexadecylphosphate and mono- and dioctadecylphosphate; and aryl and aralkyl esters containing from 6 to 10 carbon atoms in the aromatic group, for example mono- and diphenylphosphate and mono- and dibenzylphosphate.

In one particular non-limiting embodiment, the passivating polymer useful in the present invention comprises an epoxy polymer with at least one nitro group substituent and at least one phosphoric acid group having an equivalent ratio of epoxy:nitro group:phosphoric acid of 3.8/0.3/4.8 to 3.8/3/0.8. In another non-limiting embodiment, the equivalent ratio of epoxy:nitro group:phosphoric acid can be 3.8/0.8/4.2 to 3.8/1/3.2.

It has been found that contacting a metallic pigment with a passivating polymer, such as any of those described above, reduces or prevents hydrolysis or oxidation of the pigment and thereby reduces or eliminates altogether the generation of hydrogen gas. Moreover, the inclusion of metallic pigment treated with such a polymer in a waterborne coating composition does not disadvantageously affect humidity resistance of dry films (coatings) produced from such waterborne compositions.

An exemplary waterborne coating composition of the invention typically comprises a film-forming polymer, an aqueous diluent medium, and a metallic pigment at least partially treated with a passivating polymer of the invention. The tendency of the pigment to react with the aqueous medium and release gaseous material is prevented or reduced by the incorporation of an effective amount of a passivating material of the invention.

Examples of metallic pigments suitable for use in a waterborne coating composition of the invention include any metallic pigments that are generally known for use in pigmented coating compositions. Examples include, without limitation, metallic pigments, such as metallic flake pigments, comprised at least partly of aluminum, copper, zinc, iron, and/or brass as well as those composed of other malleable metals and alloys such as nickel, tin, silver, chrome, aluminum-copper alloy, aluminum-zinc alloy, and aluminum-magnesium alloy. Moreover, a waterborne coating composition of the invention also can include one or more of a wide variety of other pigments generally known for use in coating compositions, such as various color-producing pigments and/or filler pigments. Examples of such pigments include, without limitation, generally known pigments based on metal oxides; metal hydroxides; metal sulfides; metal sulfates; metal carbonates; carbon black; china clay; phthalo blues and greens, organo-reds, and organic dyes.

Various procedures can be used to incorporate a passivating material comprising a passivating polymer of the invention, such as any of those described previously, into a coating composition, such as but not limited to a waterborne coating composition of the invention. By "waterborne" coating composition is meant a coating composition in which the diluent medium is primarily an aqueous medium, i.e., the waterborne coating composition is free or substantially free of organic solvent. By "substantially free of organic solvent" is meant that the amount of organic solvent; if present, is less than 20 weight percent based on the total weight of the coating composition, such as less than 10 weight percent, such a less than 5 weight percent, such as less than 2 weight percent, such as less than 1 weight percent. As will be appreciated by one skilled in the coating art, in one non-limiting embodiment of the invention the waterborne coating composition can include a small amount of organic solvent to affect one or more of the coating properties, such as to improve flow or leveling of the applied composition or to decrease viscosity as needed. One method of incorporating the passivating material comprising a polymer of the invention is to bring the metallic pigment into contact with the passivating material prior to the incorporation of the pigment into the waterborne coating composition. This can be done by adding the passivating material of the invention to the pigment paste (e.g., pigment as normally supplied commercially), or it can be added at an earlier stage such as during the actual production of the pigment. Alternatively, a passivating material can be introduced into a waterborne coating composition of the invention by simply introducing it "neat", i.e., as a further ingredient in the formulation of the waterborne coating composition, for example during the mixing of film-forming resin, metallic pigment and aqueous medium together with other conventional and optional constituents such as crosslinking agents, co-solvents, thickeners and fillers. Irrespective of the manner in which a passivating material of the invention is incorporated into a waterborne coating composition of the invention, an amount of such compound generally is employed which is effective in reducing or eliminating gassing of the metallic pigment in the aqueous medium. For example, the amount of the passivating material can be in the range of 5 weight percent to 200 weight percent passivating material solids based on the weight of pigment solids, such as in the range of 10 weight percent to 100 weight percent, such as in the range of 10 weight percent to 80 weight percent, such as in the range of 15 weight percent to 50 weight percent, such as in the range of 16 weight percent to 25 weight percent.

One exemplary substantially organic solvent-free coating composition of the present invention can be a thermoplastic film-forming composition, or, alternatively, a thermosetting composition. As used herein, by "thermosetting composition" is meant one which "sets" irreversibly upon curing or crosslinking, wherein the polymer chains of the polymeric components are joined together by covalent bonds. This property is usually associated with a crosslinking reaction of the composition constituents often induced, for example, by heat or radiation. Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. Once cured or crosslinked, a thermosetting composition will not melt upon the application of heat and is insoluble in solvents. By contrast, a "thermoplastic composition" comprises polymeric components which are not joined by covalent bonds and thereby can undergo liquid flow upon heating and are soluble in solvents. Saunders, K. J., Organic Polymer Chemistry, pp. 41-42, Chapman and Hall, London (1973).

An exemplary coating composition of the invention comprises a diluent medium, a resinous binder system, a passivating material comprising a polymer of the invention, and at least one metal pigment particle. For example, the pigment particle can be at least partially treated with a passivating material of the invention.

The diluent medium can be a solventborne diluent medium or an aqueous (e.g., waterborne) diluent medium. By "solventborne" is meant that the diluent material is primarily a non-aqueous, e.g., organic solvent, material.

The resinous binder system typically comprises (a) at least one reactive functional group-containing film-forming polymer and (b) at least one crosslinking agent having functional groups reactive with the functional groups of the film-forming polymer.

The film-forming polymer (a) can comprise any of a variety of reactive group-containing polymers well known in the surface coatings art provided the polymer is sufficiently dispersible in the diluent media. Suitable non-limiting examples can include acrylic polymers, polyester polymers, polyurethane polymers, polyether polymers, polysiloxane polymers, polyepoxide polymers, copolymers thereof, and mixtures thereof. Also, the polymer (a) can comprise a variety of reactive functional groups, for example, functional groups selected from at least one of hydroxyl groups, carboxyl groups, epoxy groups, amino groups, amido groups, carbamate groups, isocyanate groups, and combinations thereof.

For example, suitable hydroxyl group-containing polymers can include acrylic polyols, polyester polyols, polyurethane polyols, polyether polyols, and mixtures thereof.

Suitable hydroxyl group and/or carboxyl group-containing acrylic polymers can be prepared from polymerizable ethylenically unsaturated monomers and are typically copolymers of (meth)acrylic acid and/or hydroxylalkyl esters of (meth)acrylic acid with one or more other polymerizable ethylenically unsaturated monomers such as alkyl esters of (meth)acrylic acid including methyl (meth)acrylate, ethyl (meth)acrylate, butyl (meth)acrylate and 2-ethyl hexylacrylate, and vinyl aromatic compounds such as styrene, alpha-methyl styrene, and vinyl toluene.

In a one embodiment of the present invention, the acrylic polymer can be prepared from ethylenically unsaturated, beta-hydroxy ester functional monomers, such as those described above.

Epoxy functional groups can be incorporated into the acrylic polymer prepared from polymerizable ethylenically unsaturated monomers by copolymerizing oxirane group-containing monomers, for example glycidyl (meth)acrylate and allyl glycidyl ether, with other polymerizable ethylenically unsaturated monomers, such as those discussed above. Preparation of such epoxy functional acrylic polymers is described in detail in U.S. Pat. No. 4,001,156 at columns 3 to 6.

Carbamate functional groups can be incorporated into the acrylic polymer prepared from polymerizable ethylenically unsaturated monomers by copolymerizing, for example, the above-described ethylenically unsaturated monomers with a carbamate functional vinyl monomer such as a carbamate functional alkyl ester of methacrylic acid. Useful carbamate functional alkyl esters can be prepared by reacting, for example, a hydroxyalkyl carbamate, such as the reaction product of ammonia and ethylene carbonate or propylene carbonate, with methacrylic anhydride. Other useful carbamate functional vinyl monomers include, for instance, the reaction product of hydroxyethyl methacrylate, isophorone diisocyanate, and hydroxypropyl carbamate; or the reaction product of hydroxypropyl methacrylate, isophorone diisocyanate, and methanol. Still other carbamate functional vinyl monomers may be used, such as the reaction product of isocyanic acid (HNCO) with a hydroxyl functional acrylic or methacrylic monomer such as hydroxyethyl acrylate, and those described in U.S. Pat. No. 3,479,328. Carbamate functional groups can also be incorporated into the acrylic polymer by reacting a hydroxyl functional acrylic polymer with a low molecular weight alkyl carbamate, such as methyl carbamate. Pendant carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether. Also, hydroxyl functional acrylic polymers can be reacted with isocyanic acid to provide pendent carbamate groups. Likewise, hydroxyl functional acrylic polymers can be reacted with urea to provide pendent carbamate groups.

The polymers prepared from polymerizable ethylenically unsaturated monomers can be prepared by solution polymerization techniques, which are well known to those skilled in the art, in the presence of suitable catalysts such as organic peroxides or azo compounds, for example, benzoyl peroxide or N,N-azobis(isobutylronitrile). The polymerization can be carried out in an organic solution in which the monomers are soluble by techniques conventional in the art. Alternatively, these polymers can be prepared by aqueous emulsion or dispersion polymerization techniques which are well known in the art. The ratio of reactants and reaction conditions are selected to result in an acrylic polymer with the desired pendent functionality.

Polyester polymers are also useful in the film-forming compositions of the invention. Useful polyester polymers typically include the condensation products of polyhydric alcohols and polycarboxylic acids. Suitable polyhydric alcohols can include ethylene glycol, neopentyl glycol, trimethylol propane, and pentaerythritol. Suitable polycarboxylic acids can include adipic acid, 1,4-cyclohexyl dicarboxylic acid, and hexahydrophthalic acid. Besides the polycarboxylic acids mentioned above, functional equivalents of the acids such as anhydrides where they exist or lower alkyl esters of the acids such as the methyl esters can be used. Also, small amounts of monocarboxylic acids such as stearic acid can be used. The ratio of reactants and reaction conditions are selected to result in a polyester polymer with the desired pendent functionality, i.e., carboxyl or hydroxyl functionality.

For example, hydroxyl group-containing polyesters can be prepared by reacting an anhydride of a dicarboxylic acid such as hexahydrophthalic anhydride with a diol such as neopentyl glycol in a 1:2 molar ratio. Where it is desired to enhance air drying, suitable drying oil fatty acids may be used and include those derived from linseed oil, soya bean oil, tall oil, dehydrated castor oil, or tung oil.

Carbamate functional polyesters can be prepared by first forming a hydroxyalkyl carbamate that can be reacted with the polyacids and polyols used in forming the polyester. Alternatively, terminal carbamate functional groups can be incorporated into the polyester by reacting isocyanic acid with a hydroxy functional polyester. Also, carbamate functionality can be incorporated into the polyester by reacting a hydroxyl polyester with a urea. Additionally, carbamate groups can be incorporated into the polyester by a transcarbamoylation reaction. Preparation of suitable carbamate functional group-containing polyesters are those described in U.S. Pat. No. 5,593,733 at column 2, line 40 to column 4, line 9.

Polyurethane polymers containing terminal isocyanate or hydroxyl groups also can be used as the polymer in the coating compositions of the invention. The polyurethane polyols or NCO-terminated polyurethanes which can be used are those prepared by reacting polyols including polymeric polyols with polyisocyanates. Polyureas containing terminal isocyanate or primary and/or secondary amine groups which also can be used are those prepared by reacting polyamines including polymeric polyamines with polyisocyanates. The hydroxyl/isocyanate or amine/isocyanate equivalent ratio is adjusted and reaction conditions are selected to obtain the desired terminal groups. Examples of suitable polyisocyanates include those described in U.S. Pat. No. 4,046,729 at column 5, line 26 to column 6, line 28, incorporated herein by reference. Examples of suitable polyols include those described in U.S. Pat. No. 4,046,729 at column 7, line 52 to column 10, line 35. Examples of suitable polyamines include those described in U.S. Pat. No. 4,046,729 at column 6, line 61 to column 7, line 32 and in U.S. Pat. No. 3,799,854 at column 3, lines 13 to 50.

Carbamate functional groups can be introduced into the polyurethane polymers by reacting a polyisocyanate with a polyester having hydroxyl functionality and containing pendent carbamate groups. Alternatively, the polyurethane can be prepared by reacting a polyisocyanate with a polyester polyol and a hydroxyalkyl carbamate or isocyanic acid as separate reactants. Examples of suitable polyisocyanates are aromatic isocyanates, such as 4,4'-diphenylmethane diisocyanate, 1,3- phenylene diisocyanate and toluene diisocyanate, and aliphatic polyisocyanates, such as 1,4-tetramethylene diisocyanate and 1,6-hexamethylene diisocyanate. Cycloaliphatic diisocyanates, such as 1,4-cyclohexyl diisocyanate and isophorone diisocyanate also can be employed.

Examples of suitable polyether polyols include polyalkylene ether polyols such as those having the following structural formulas (I) or (II):

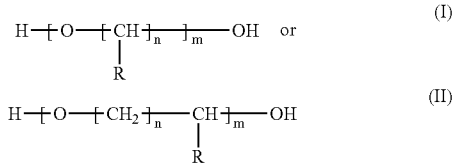

wherein the substituent R is hydrogen or a lower alkyl group containing from 1 to 5 carbon atoms including mixed substituents, and n has a value typically ranging from 2 to 6 and m has a value ranging from 8 to 100 or higher. Exemplary polyalkylene ether polyols include poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, glycols such as ethylene glycol, 1,6-hexanediol, Bisphenol A, and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Specific examples of polyethers include those sold under the names TERATHANE and TERACOL, available from E.I. Du Pont de Nemours and Company, Inc.

As previously mentioned, in certain embodiments of the present invention, the film-forming composition may also comprise (b) one or more crosslinking agents that are adapted to react with the functional groups of the polymer and/or any of the previously mentioned polymeric microparticles and/or additives to provide curing, if desired, for the film-forming composition. Non-limiting examples of suitable crosslinking agents include any of the aminoplasts and polyisocyanates as are well known in the surface coatings art, provided that the crosslinking agent(s) are adapted to be water soluble or water dispersible as described below, and polyacids, polyanhydrides and mixtures thereof. When used, selection of the crosslinking agent or mixture of crosslinking agents is dependent upon the functionality associated with the polymeric microparticles, such as hydroxyl and/or carbamate functionality. When, for example, the functionality is hydroxyl, the hydrophilic crosslinking agent may be an aminoplast or polyisocyanate crosslinking agent.

Examples of aminoplast resins suitable for use as the crosslinking agent include those containing methylol or similar alkylol groups, a portion of which have been etherified by reaction with a lower alcohol, such as methanol, to provide a water soluble/dispersible aminoplast resin. One appropriate aminoplast resin is the partially methylated aminoplast resin, CYMEL 385, which is commercially available from Cytec Industries, Inc. An example of a blocked isocyanate which is water soluble/dispersible and suitable for use as the crosslinking agent is dimethylpyrazole blocked hexamethylene diisocyanate trimer commercially available as BI 7986 from Baxenden Chemicals, Ltd. in Lancashire, England.

Polyacid crosslinking materials suitable for use in the present invention can include, for example, those that on average generally contain greater than one acid group per molecule, sometimes three or more and sometimes four or more, such acid groups being reactive with epoxy functional film-forming polymers. Polyacid crosslinking materials may have di-, tri- or higher functionalities. Suitable polyacid crosslinking materials which can be used include, for example, carboxylic acid group-containing oligomers, polymers and compounds, such as acrylic polymers, polyesters, and polyurethanes and compounds having phosphorus-based acid groups.

Examples of suitable polyacid crosslinking agents include, for example, ester group-containing oligomers and compounds including half-esters formed from reacting polyols and cyclic 1,2-acid anhydrides or acid functional polyesters derived from polyols and polyacids or anhydrides. These half-esters are of relatively low molecular weight and are quite reactive with epoxy functionality. Suitable ester group-containing oligomers include those described in U.S. Pat. No. 4,764,430, column 4, line 26 to column 5, line 68, which is hereby incorporated by reference.

Other useful crosslinking agents include acid-functional acrylic crosslinkers made by copolymerizing methacrylic acid and/or acrylic acid monomers with other ethylenically unsaturated copolymerizable monomers as the polyacid crosslinking material. Alternatively, acid-functional acrylics can be prepared from hydroxy-functional acrylics reacted with cyclic anhydrides.

In accordance with certain embodiments of the present invention, the crosslinking agent (b) which typically is water soluble/dispersible, may be present as a component in the film-forming composition in an amount ranging from 0 to at least 10 weight percent, or at least 10 to at least 20 weight percent, or from at least 20 to at least 30 weight percent based on total resin solids weight in the film-forming composition. In accordance with certain embodiments of the present invention, the crosslinking agent may be present as a component in the film-forming composition in an amount ranging from less than or equal to 70 to less than or equal to 60 weight percent, or less than or equal to 60 to less than or equal to 50 weight percent, or less than or equal to 50 to less than or equal to 40 weight percent based on total resin solids weight of the film-forming composition. The crosslinking agent can be present in the film-forming composition in an amount ranging between any combination of these values inclusive of the recited ranges.

Resinous binders for a basecoat can be organic solvent-based materials, such as those described in U.S. Pat. No. 4,220,679, note column 2, line 24 continuing through column 4, line 40. Also, water-based coating compositions, such as those described in U.S. Pat. No. 4,403,003, U.S. Pat. No. 4,147,679, and U.S. Pat. No. 5,071,904, can be used as the binder in the basecoat composition.

The coating composition can include various other ingredients generally known for use in waterborne coating compositions. Examples of various other ingredients include: fillers; plasticizers; antioxidants; mildewcides and fungicides; surfactants; various flow control agents including, for example, thixotropes and additives for sag resistance and/or pigment orientation such as precipitated silicas, fumed silicas, organo-modified silicas, bentone clays, organo-modified bentone clays, and such additives based on polymer microparticles (sometimes referred to as microgels) described for example in U.S. Pat. Nos. 4,025,474; 4,055,607; 4,075,141; 4,115,472; 4,147,688; 4,180,489; 4,242,384; 4,268,547; 4,220,679; and 4,290,932.

Examples of organic solvents and/or diluents that can be employed in an organic solvent-borne coating composition of the invention include alcohols, such as lower alkanols containing 1 to 8 carbon atoms including methanol, ethanol, n-propanol, isopropanol, butanol, sec-butyl alcohol, tertbutyl alcohol, amyl alcohol, hexyl alcohol and 2-ethylhexyl alcohol; ethers and ether alcohols such as ethyleneglycol monoethyl ether, ethyleneglycol monobutyl ether, ethyleneglycol dibutyl ether, propyleneglycol monomethyl ether, diethyleneglycol monobutyl ether, diethyleneglycol dibutyl ether, dipropyleneglycol monomethyl ether, and dipropyleneglycol monobutyl ether; ketones such as methyl ethyl ketone, methyl isobutyl ketone, methyl amyl ketone and methyl N-butyl ketone; esters such as butyl acetate, 2-ethoxyethyl acetate and 2 ethylhexyl acetate; aliphatic and alicyclic hydrocarbons such as the various petroleum naphthas and cyclohexane; and aromatic hydrocarbons such as toluene and xylene. The amount of organic solvent and/or diluent utilized in an organic solvent-borne coating composition of the invention may vary widely. However, in one non-limiting embodiment, the amount of organic solvent and/or diluent can range from about 10 percent to about 50 percent, such as from 20 percent to 40 percent, by weight based on the total weight of organic solvent-borne coating composition.

Passivating materials of the present invention can also be utilized in powder coating compositions comprising a film-forming polymer and a pigment (typically a metallic pigment).

The following examples illustrate the invention and should not be construed as a limitation on the scope thereof. Unless specifically indicated otherwise, all percentages and amounts are understood to be by weight.

EXAMPLES

The following examples illustrate the gassing characteristics of exemplary coating compositions incorporating passivating materials comprising polymers of the present invention as compared to commercially available passivating materials.

Preparation of Passivating Materials

Polymers for use in the passivating materials of the present invention and compositions incorporating the polymers were prepared as follows:

Polymer Synthesis Example 1 (PE1)

A passivating polymer of the present invention was prepared as described below from the following ingredients.

TABLE 1

| | Ingredients | Amounts (gram) |
|---|---|---|
| 1 | EPON 828[1] | 358.5 |
| 2 | N-methyl pyrrolidone | 263.4 |
| 3 | 2-Nitrophenol | 106.1 |
| 4 | Phosphoric Acid | 73.1 |
| 5 | Propyl ether of propylene glycol | 263.3 |
| 6 | N,N-dimethyl ethanol amine | 43.2 |
| 7 | Deionized water | 671.0 |

[1]EPON 828 is bis-epoxy with an epoxy equivalent weight of 188 and is commercially available from Shell Oil and Chemical Co.

A reactor was charged with the first three ingredients and heated to a temperature of 100° C. under nitrogen and was held at this temperature for about an hour. The reaction mixture was cooled to a temperature of 30° C. and ingredient 4 was then added. The reaction temperature was then raised to 100° C., and the mixture was held at this temperature for approximately 2 hours. The product thus formed was then diluted with ingredients 5, 6, and 7 under agitation. The product was cooled to room temperature. The reaction product had a solid content of about 32% and a pH of 5.7.

Polymer Synthesis Example 2 (PE2)

This polymer was prepared as was the polymer of Example 1 but replacing 2-nitophenol with 4-nitrobenzoic acid on an equivalent basis.

Polymer Synthesis Example 3 (PE3)

This polymer was prepared as was the polymer of Example 2 but replacing one half of the 4-nitrobenzoic acid with isonicotinic acid on an equivalent basis.

Polymer Synthesis Example 4 (PE4)

This polymer was prepared as was the polymer of Example 2 but replacing the 4-nitrobenzoic acid with isonicotinic acid on an equivalent basis.

Polymer Synthesis Example 5 (PE5)

This polymer was prepared as was the polymer of Example 2 but reacting all of the EPON 828 with only 4-nitrobenzoic acid. No phosphoric acid was used.

Polymer Synthesis Example 6 (PE6)

This polymer was prepared as was the polymer of Example 2 but replacing 42 weight percent of the phosphoric acid with trimellitic anhydride on an equivalent basis.

Polymer Synthesis Example 7 (PE7)

This polymer was prepared as was the polymer of Example 2 but replacing 50 equivalent percent of the 4-nitrobenzoic acid with a reaction product of phthalic anhydride and hydroxyethylethylene urea (prepared by reacting the two components at 120° C.).

Polymer Synthesis Example 8 (PE8)

This polymer was made in the same way as the polymer of Example 2 but replacing the 4-nitrobenzoic acid with isostearic acid on an equivalent basis.

Polymer Synthesis Example 9 (PE9)

This polymer was prepared as was the polymer of Example 8 but replacing EPON 828 with EPON 872 (epoxy equivalent weight of 645) on an equivalent basis.

Polymer Synthesis Example 10 (PE10)

A polyurethane acrylate was prepared as described below from the following ingredients:

TABLE 2

| | Amount (grams) | Material |
|---|---|---|
| 1 | 934.0 | polyester polyol having a hydroxyl value of 120 (prepared from trimethylolpropane (15.2%), neopentyl glycol (35.3%), and adipic acid (49.5%).) |
| 2 | 108.0 | hydroxyethyl acrylate (HEA) |
| 3 | 1.2 | dibutyltin dilaurate |
| 4 | 1.2 | butylated hydroxytoluene |
| 5 | 157.2 | hexamethylenediisocynate (HDI) |
| 6 | 262.2 | butyl acrylate (BA) |

The first four ingredients were stirred in a flask as the HDI was added over a one hour period at a temperature of 70° C. to 80° C. 39 g of the butyl acrylate then was used to rinse the addition funnel and the temperature of the reaction mixture then was held at 70° C. for an additional 2 hours as all the isocyanate reacted. The remainder of the butyl acrylate then was added to produce an 80% solution with a Gardner-Holdt viscosity of X.

A pre-emulsion was prepared from the following ingredients:

TABLE 3

| | Amount (grams) | Ingredients |
|---|---|---|
| 1 | 1003.80 | polyurethane acrylate prepared as described immediately above |
| 2 | 120.40 | butyl acrylate |
| 3 | 147.00 | methyl methacrylate (MMA) |
| 4 | 20.60 | acrylic acid |
| 5 | 13.52 | dimethylethanolammonium dodecylbenzene sulfonate, 50% in water (DDBSA/DMEA) |
| 6 | 46.16 | ALIPAL Co 436, anionic surfactant, available from Rhodia Chemicals |
| 7 | 17.92 | AEROSOL OT-75 (sodium dioctylsulfosuccinate available from Cytec Industries, Inc.) |
| 8 | 1246.00 | Deionized water |

The pre-emulsion was passed once through an M110 MICROFLUIDIZER® emulsifier at 7000 psi to produce a microdispersion. The microdispersion was stirred at 22° C. under nitrogen in a round bottom flask and the ingredients listed in the following Table 4 were added.

TABLE 4

| | Amount (grams) | Ingredients |
|---|---|---|
| 1 | 429.90 | deionized water |
| 2 | 2.00 | isoascorbic acid |
| 3 | 2.86 | ferrous ammonium sulfate (1% aqueous solution) |
| 4 | 2.94 | hydogen peroxide (30% aqueous solution) |
| 5 | 21.50 | dimethylethanol amine |

Upon addition of the ingredients of Table 4, the reaction temperature rose spontaneously to 56° C. after approximately 15 minutes. The final product had the following characteristics:
total solids about 42 wt. %;
pH about 8.3; and
Brookfield viscosity (50 rpm, spindle #1) about 14 cps

Polymer Example 11 (PE11)

This example describes the preparation of an acrylic polyester polymer. The acrylic polyester was prepared from the following ingredients as described below.

Polyester (P): The polyester was prepared in a four neck round bottom flask equipped with a thermometer, mechanical stirrer, condenser, dry nitrogen sparge, and a heating mantle. The polyester was prepared from ingredients listed in the following Table 5.

TABLE 5

| | Amount (grams) | Ingredients |
|---|---|---|
| 1 | 1103.00 | stearic acid |
| 2 | 800.00 | pentaerithritol |
| 3 | 480.00 | crotonic acid |
| 4 | 688.00 | phthalic acid |
| 5 | 6.12 | dibutyl tin dilaurate |
| 6 | 6.12 | triphenyl phosphite |
| 7 | 1200.00 | butyl acrylate |

The first six ingredients were stirred in the flask at a temperature 230° C. The distillate was collected in a Dean Stark trap and the mixture was held at this temperature until the acid value dropped to less than 5. The product was then cooled to a temperature of below 80° C. and diluted with the butyl acrylate.

Polyester/acrylic Latex Preparation

A pre-emulsion was prepared by stirring together the following ingredients:

TABLE 6

| | Amount (grams) | Ingredients |
|---|---|---|
| 1 | 1000.0 | deionized water |
| 2 | 295.0 | Polyester (P) |
| 3 | 30.0 | Ethyleneglycol dimethacrylate |
| 4 | 20.0 | acrylic acid |
| 5 | 655.0 | butyl acrylate |
| 6 | 46.4 | dodecylbenzenesulphonic acid |
| 7 | 14.3 | Dimethyl ethanolamine |

The pre-emulsion was passed once through a MICROFLUIDIZER® M110T at 8000 psi and transferred to a four neck round bottom flask equipped with an overhead stirrer, condenser, thermometer, and a nitrogen atmosphere. 150.0 g of deionized water used to rinse the MICROFLUIDIZER® was added to the flask. The polymerization was initiated by adding 4.0 g of isoascorbic acid and 0.02 g of ferrous ammonium sulfate dissolved in 120.0 g water followed by an addition over a thirty minute period of 4.0 g of 70% t-butyl hydroperoxide (dissolved in 115.0 g of water). The reaction temperature increased from 24° C. to 85° C. during this time. The temperature was reduced to 28° C. at which time 36 g of 33.3% aqueous dimethylethanolamine was added, followed by 2.0 g of PROXEL GXL (biocide commercially available from ICI Americas, Inc.) in 8.0 g of water. The pH of the latex thus formed was 7.9, the nonvolatile content was 42.0%, and the Brookfield viscosity was 17 cps (spindle #1, 50 rpm).

Polymer Example 12 (PE12)

This example describes the preparation of an acrylic dispersion. The acrylic dispersion was prepared as described below from the ingredients listed in the following Table 7.

TABLE 7

| | Amount (grams) |
|---|---|
| STAGE 1 | |
| Charge #1 | |
| Deionized water | 884.2 |
| Dioctylsulfosuccinate | 17.0 |
| Feed A | |
| Methyl methacrylate | 441.6 |
| Butyl acrylate | 147.2 |
| Methacrylic acid | 11.9 |
| Dioctylsulfosuccinate | 13.6 |
| Deionized water | 423.3 |
| Feed B | |
| Deionized water | 339.6 |
| Ammonium persulfate | 2.5 |
| STAGE II | |
| Feed C | |
| Methyl methacrylate | 71.0 |
| Butylacrylate | 35.0 |
| Hydroxyethyl acrylate | 6.9 |
| Dioctylsulfosuccinate | 2.4 |
| Deionized water | 75.2 |
| Feed D | |
| Deionized water | 319.8 |
| Ammonium persulfate | 0.42 |
| STAGE III | |
| Feed E | |
| Methyl methacrylate | 71.0 |
| Methyl methacrylate | 12.3 |
| Butyl acrylate | 30.8 |
| Hydroxyethyl methacrylate | 40.2 |
| Methacrylic acid | 22.7 |
| Ethyleneglycol dimethacrylate | 34.5 |
| Dioctylsulfosuccinate | 2.4 |
| Deionized water | 97.5 |
| Feed F | |
| Deionized water | 319.8 |
| Ammonium persulfate | 0.54 |
| Sodium bicarbonate | 1.3 |
| Feed G | |
| Dimethyl ethanolamine | 10.9 |
| Deionized water | 176.0 |

Charge #1 was added to a reactor fitted with thermocouple, agitator, and reflux condenser. The contents of the reactor then were heated to a temperature of 80° C. Then Feeds A and B (Stage I) were added to the reactor over three hours, and the reaction mixture was stirred for 30 minutes at temperature of 80° C. Feeds C and D (stage 11) then were added over a period of 30 minutes and then stirred for 30 minutes at 80° C. At this time Feeds E and F (Stage II) were added over 30 minutes, stirred for one hour, and cooled to ambient temperature. Then, Feed G then was added over 5 minutes then stirred for 10 minutes more.

Polymer Example 13 (PE-13)

This example describes the preparation of a polymer with the following ingredients:

TABLE 8

| | Ingredients | Amount (grams) |
|---|---|---|
| 1 | Dimethylpropionic acid | 79.2 |
| 2 | Neopentylglycol | 14.9 |
| 3 | FORMREZ 55-56[1] | 193.3 |
| 4 | Poly THF[2] | 193.3 |
| 5 | Dibutyl tin dilaurate | 1.7 |
| 6 | Butanol | 3.87 |
| 7 | N-methylpyrrolidone | 195.6 |
| 8 | DESMODUR W[3] | 28.0 |
| 9 | N-methylpyrrolidone | 28.0 |
| 10 | Deionized water | 2366.4 |
| 11 | Ethylenediamine | 14.2 |
| 12 | Dimethylethanolamine | 51.8 |

[1]hydroxy functional polyester, molecular weight 2000, available from Witco Chemicals
[2]hydroxy functional polyether, made by polymerizing tetrahydrofurane, molecular weight 2000, available from E.I. DuPont de Neumors and Co.
[3]diisocyanate, available from Bayer corporation A reactor was charged with the first seven ingredients and heated to 80° C. under a nitrogen blanket until mixture became homogeneous. It was then cooled to 55° C. and premixed ingredients 8 and 9 were added over 30 minutes. The mixture was allowed to exotherm up to 90° C. The mixture was then held at this temperature until the isocyanate equivalent weight became around 1370. The premixed ingredients 10, 11, and 12 were then added. The product was stirred for additional 30 minutes and cooled to room temperature. The final product had total nonvolatile component of 24%, and viscosity less than 100 centipoise.

Preparation of Aqueous Compositions

Basecoat Examples BC1-10

Aqueous silver metallic basecoat compositions containing the passivators of Examples 1 to 10 were prepared. For each of the basecoat compositions (Examples BC1-10 below), an aluminum pigment slurry, Premix A1-10, respectively, first was prepared as described below from the following ingredients. Amounts listed below are in parts by weight (grams). The Premix A1-10 components were admixed under mild agitation, and the admixture was allowed to stir for 30 minutes until well dispersed. Premix A1 utilized a commercially available passivating material (LUBRIZOL 2062 commercially available from the Lubrizol Company).

TABLE 9

Premix A1-14

| COMPONENT | A1 Comparative | A2 | A3 | A4 | A5 | A6 | A7 | A8 | A9 | A10 Comparative |
|---|---|---|---|---|---|---|---|---|---|---|
| Dipropylene Glycol Monomethyl ether | 5.3 | 5.3 | 5.3 | 5.3 | 5.3 | 5.3 | 5.3 | 5.3 | 5.3 | 5.3 |
| Polypropylene Glycol[1] | 9.5 | 9.5 | 9.5 | 9.5 | 9.5 | 9.5 | 9.5 | 9.5 | 9.5 | 9.5 |
| TINUVIN 1130[2] | 2.7 | 2.7 | 2.7 | 2.7 | 2.7 | 2.7 | 2.7 | 2.7 | 2.7 | 2.7 |
| Aluminum Paste[3] | 20.3 | 20.3 | 20.3 | 20.3 | 20.3 | 20.3 | 20.3 | 20.3 | 20.3 | 20.3 |
| Aluminum Passivator[4] | 6.9 | 0 | 0 | 0 | 0 | 0 | 0 | 0 | 0 | 0 |
| PE 1 | 0 | 7.5 | 0 | 0 | 0 | 0 | 0 | 0 | 0 | 0 |

TABLE 9-continued

Premix A1-14

| COMPONENT | A1 Comparative | A2 | A3 | A4 | A5 | A6 | A7 | A8 | A9 | A10 Comparative |
|---|---|---|---|---|---|---|---|---|---|---|
| PE 2[8] | 0 | 0 | 8.4 | 0 | 0 | 0 | 0 | 0 | 0 | 0 |
| PE 3[8] | 0 | 0 | 0 | 10.2 | 0 | 0 | 0 | 0 | 0 | 0 |
| PE 4[8] | 0 | 0 | 0 | 0 | 9.1 | 0 | 0 | 0 | 0 | 0 |
| PE 5[8] | 0 | 0 | 0 | 0 | 0 | 12.0 | 0 | 0 | 0 | 0 |
| PE 6[8] | 0 | 0 | 0 | 0 | 0 | 0 | 7.3 | 0 | 0 | 0 |
| PE 7[8] | 0 | 0 | 0 | 0 | 0 | 0 | 0 | 8.0 | 0 | 0 |
| PE 8[8] | 0 | 0 | 0 | 0 | 0 | 0 | 0 | 0 | 5.9 | 0 |
| PE 9[8] | 0 | 0 | 0 | 0 | 0 | 0 | 0 | 0 | 0 | 12.7 |
| CYMEL ® 385[5] | 11.8 | 11.8 | 11.8 | 11.8 | 11.8 | 11.8 | 11.8 | 11.8 | 11.8 | 11.8 |
| 50% Aqueous DMEA[6] | 0.3 | 0.3 | 0.3 | 0.3 | 0.3 | 0.3 | 0.3 | 0.3 | 0.3 | 0.3 |
| Phosphatized epoxy[7] | 0.7 | 0.7 | 0.7 | 0.7 | 0.7 | 0.7 | 0.7 | 0.7 | 0.7 | 0.7 |

[1]Polypropylene glycol PPG-425 available from BASF.
[2]Substituted benzotriazole UV light absorber available from Ciba Additives.
[3]TOYO Aluminum pigment paste TCR-3040 available from Toyal America, Inc.
[4]A 60/36/4 w/w solution of LUBRIZOL 2062/diisopropanolamine/Propylene glycol Butyl ether LUBRIZOL 2062 is available from the Lubrizol Co. and includes a styrene allyl alcohol copolymer reacted with phosphoric acid and t-butyl phenol.
[5]Methylated trimethylol melamine resin available from Cytec Industries, Inc.
[6]50% solution of dimethylethanolamine in deionized water
[7]Phosphatized epoxy which is the reaction product EPON828 and phosphoric acid (at a weight ratio of 83 to 17).
[8]PE = Polymer of Example Basecoat compositions (Examples BC1 to BC10) were prepared as described below from the following ingredients. The amounts listed below are in parts by weight (grams) unless otherwise indicated. Basecoat composition BC1 was used as a control and contained the commercially available passivating material.

TABLE 10

| COMPONENT | BC 1* Comparative | BC2 | BC3 | BC4 | BC5 | BC6 | BC7 | BC8 | BC9 | BC10* Comparative |
|---|---|---|---|---|---|---|---|---|---|---|
| Acrylic Latex[8] | 95.1 | 95.1 | 95.1 | 95.1 | 95.1 | 95.1 | 95.1 | 95.1 | 95.1 | 95.1 |
| Deionized Water | 45.8 | 45.8 | 45.8 | 45.8 | 45.8 | 45.8 | 45.8 | 45.8 | 45.8 | 45.8 |
| 50% Aqueous DMEA | 0.9 | 0.9 | 0.9 | 0.9 | 0.9 | 0.9 | 0.9 | 0.9 | 0.9 | 0.9 |
| CYMEL ® 385[9] | 23.0 | 23.0 | 23.0 | 23.0 | 23.0 | 23.0 | 23.0 | 23.0 | 23.0 | 23.0 |
| n-Butoxy Propanol | 25.7 | 25.7 | 25.7 | 25.7 | 25.7 | 25.7 | 25.7 | 25.7 | 25.7 | 25.7 |
| Mineral Spirits[10] | 4.8 | 4.8 | 4.8 | 4.8 | 4.8 | 4.8 | 4.8 | 4.8 | 4.8 | 4.8 |
| Premix A1 | 57.5 | 0 | 0 | 0 | 0 | 0 | 0 | 0 | 0 | 0 |
| Premix A2 | 0 | 58.1 | 0 | 0 | 0 | 0 | 0 | 0 | 0 | 0 |
| Premix A3 | 0 | 0 | 58.1 | 0 | 0 | 0 | 0 | 0 | 0 | 0 |
| Premix A4 | 0 | 0 | 0 | 60.8 | 0 | 0 | 0 | 0 | 0 | 0 |
| Premix A5 | 0 | 0 | 0 | 0 | 59.7 | 0 | 0 | 0 | 0 | 0 |
| Premix A6 | 0 | 0 | 0 | 0 | 0 | 62.6 | 0 | 0 | 0 | 0 |
| Premix A7 | 0 | 0 | 0 | 0 | 0 | 0 | 59.9 | 0 | 0 | 0 |
| Premix A8 | 0 | 0 | 0 | 0 | 0 | 0 | 0 | 60.6 | 0 | 0 |
| Premix A9 | 0 | 0 | 0 | 0 | 0 | 0 | 0 | 0 | 56.5 | 0 |
| Premix A10 | 0 | 0 | 0 | 0 | 0 | 0 | 0 | 0 | 0 | 63.3 |

[8]Polymer of Example 10
[9]Methylated trimethylol melamine resin available from Cytec Industries, Inc.
[10]Mineral Spirits available from Shell Chemical Co.

Each of the aqueous basecoat compositions of Examples BC1 to BC10 was prepared by mixing the above-listed ingredients under agitation. The pH of each composition was adjusted to 8.4-8.6 using an appropriate amount of a 50% aqueous solution of DMEA. Following an equilibration period of sixteen hours at ambient conditions, the pH of each basecoat was readjusted to 8.4-8.6 using an appropriate amount of a 50% aqueous solution of DMEA. The viscosity of each of the compositions then was reduced to 24 to 26 seconds spray viscosity (Ford #4 cup) using deionized water. The samples were then placed into the gassing test as described below.

Gassing Evaluation

Each of the aqueous basecoat compositions of Examples BC1 to BC10 was evaluated to measure the amount of gas evolved from an aluminum flake-containing waterborne coating. The test method was used to determine the effectiveness of aluminum flake passivators (i.e., gassing inhibitors) in stopping or inhibiting the reaction between the aluminum pigment surface and water, which generates hydrogen gas and heat. The method included loading an aluminum flake-containing waterborne paint into a gassing experiment apparatus which measured the amount of gas evolved in milliliters (ml) of gas evolved per 200 grams of basecoat composition over a period of 7 days.

Following the final pH and viscosity adjustments described above, 200 grams of each basecoat composition was placed into a separate 250 ml Erlenmeyer flask and capped with a greased glass adapter with a hose connector (Tygon tubing). A taper clip was attached at the joint of the flask and adapter. A lead weight was placed around each of the filled Erlenmeyer flasks and each was then placed into a pre-set constant temperature bath of 40° C. Four hours in the bath was then allowed for temperature equilibration.

While the compositions were equilibrating, ring stands and burettes were assembled in a Nalgene tub next to the constant temperature bath. Ring stands were placed in the Nalgene tub filled with water. Burette clamps were attached to the ring stands. For each basecoat, a 250 ml burette was filled with water and inverted in the Nalgene tub filled with water. The inverted burette was placed so that the top of the inverted burette was below the top of the water level in the tub. The burettes were clamped into place with burette clamps.

Following the equilibration period, the Tygon tubing was inserted into the inverted burette and then attached to the end of the hose adapter on the flasks inside the constant temperature bath. The initial water level in the burette was then recorded (in ml). The difference between the initial water level and the final water level after 7 days in the test apparatus was recorded as the amount of gas evolved from the basecoat. As will be appreciated by one skilled in the art, gassing results can differ from one run to another due to slight changes in the experimental conditions. Therefore, the gassing results in Table 11 should be understood to have a tolerance of plus or minus about 5 ml.

The gassing data presented in Table 11 below illustrates that aqueous metallic basecoat compositions containing the aluminum passivators of the present invention (i.e., the compositions of Examples BC2 to BC14) provide similar or improved aluminum flake passivation as compared with the commercially available passivator (Example BC1).

TABLE 11

| BASECOAT | GAS Evolved (in ml) |
|---|---|
| Example BC1* | 12-18 |
| Example BC2 | 10 |
| Example BC3 | 0 |
| Example BC4 | 3 |
| Example BC5 | 8 |
| Example BC6 | 0 |
| Example BC7 | 4 |
| Example BC8 | 0 |
| Example BC9 | 6 |
| Example BC10* | 15 |

*Comparative Example

Basecoat Examples BC11 to BC13

The following Examples BC11 to BC13 describe the preparation of aqueous silver metallic basecoat compositions. For each of the basecoat compositions of Examples BC11 to BC13, an aluminum pigment slurry, Premix A11-13, respectively, first was prepared as described below from the following ingredients. Amounts listed below are in parts by weight (grams). The Premix A11-13 components were admixed under agitation, and the admixture was allowed to stir for 30 minutes until well dispersed. Premix A11 utilized a commercially available passivating material (LUBRIZOL 2062 commercially available from the Lubrizol Company).

TABLE 12

| Premix A11-13 | | | |
|---|---|---|---|
| COMPONENT | A11 | A12 | A13 |
| Ethylene Glycol Monohexyl ether | 40.3 | 40.3 | 40.3 |
| 1-octanol | 8.1 | 8.1 | 8.1 |
| Phosphatized epoxy[11] | 1.0 | 1.0 | 1.0 |

TABLE 12-continued

| Premix A11-13 | | | |
|---|---|---|---|
| COMPONENT | A11 | A12 | A13 |
| TINUVIN 1130[12] | 3.0 | 3.0 | 3.0 |
| Aluminum Paste[13] | 27.2 | 27.2 | 27.2 |
| Aluminum Passivator[14] | 5.6 | 0 | 0 |
| PE1 | 0 | 6.2 | 0 |
| PE2 | 0 | 0 | 6.2 |
| CYMEL ® 327[15] | 11.2 | 11.2 | 11.2 |

[11]Reaction product of EPON 828 and phosphoric acid at a weight ratio of 83 to 17.
[12]Substituted benzotriazole UV light absorber available from Ciba Additives.
[13]Aluminum pigment paste ALPATE 7670NS available from Toyal Europe.
[14]A 60/36/4 w/w solution of LUBRIZOL 2062/diisopropanolamine/Propylene glycol Butyl ether. LUBRIZOL 2062 is available from the Lubrizol Co.
[15]Methylated melamine formaldehyde resin available from Cytec Industries, Inc.

Aqueous Basecoat Compositions

Each of the aqueous basecoat compositions of Examples BC11 to BC13 was next prepared as described below from the following ingredients. Amounts listed below are in parts by weight (grams) unless otherwise indicated.

TABLE 13

| COMPONENT | BC 11 | BC12 | BC13 |
|---|---|---|---|
| Polyester/Acrylic Latex[16] | 134.1 | 134.1 | 134.1 |
| Mineral Spirits[17] | 6.0 | 6.0 | 6.0 |
| Witcobond ® W-242[18] | 43.3 | 43.3 | 43.3 |
| Acrylic Latex[19] | 76.5 | 76.5 | 76.5 |
| 50% Aqueous DMEA | 3.0 | 3.0 | 3.0 |
| Deionized Water | 332.9 | 332.9 | 332.9 |
| Premix A11 | 96.4 | 0 | 0 |
| Premix A12 | 0 | 97.0 | 0 |
| Premix A13 | 0 | 0 | 97.0 |
| Aqueous Thickener Solution[20] | 50.0 | 50.0 | 50.0 |
| Viscolam ® 330[21] | 3.3 | 3.3 | 3.3 |
| 50% Aqueous DMEA | 1.6 | 1.6 | 1.6 |

[16]PE = Polymer of Example
[17]Mineral Spirits available from Shell Chemical Co.
[18]Aqueous polyurethane dispersion available from Crompton Corp.
[19]PE = Polymer of Example
[20]2% solution of LAPONITE RD in deionized water. LAPONITE RD is a synthetic clay available from Southern Clay Products, Inc.
[21]Viscolam 330 is an acrylic thickener emulsion available from Lehmann & Voss.

Each of the aqueous basecoat compositions of Examples BC11-13 was prepared by mixing the above-listed ingredients under agitation. The pH of each composition was adjusted to 8.4-8.6 using an appropriate amount of a 50% aqueous solution of DMEA. The viscosity of each of the aqueous basecoat compositions then was reduced to 33 to 37 seconds spray viscosity (DIN #4 cup) using deionized water.

Gassing Evaluation

Each of the aqueous basecoat compositions of Examples BC11 to BC13 were evaluated according to the gassing test method described previously for Examples BC1 to BC10.

The gassing data presented in Table 14 below illustrates that aqueous metallic basecoat compositions containing the aluminum passivators of the present invention (i.e., the compositions of Examples BC12 to BC13) provide similar or improved aluminum flake passivation as compared with the control passivator (i.e., the composition of Example BC11) containing the commercially available passivating material.

TABLE 14

| BASECOAT | Gas Evolved (in ml) |
|---|---|
| Example BC11 | 9 |
| Example BC12 | 0 |
| Example BC13 | 6 |

Examples BC14 to BC17

The following Examples BC14 to BC17 (Table 16) describe the preparation of aqueous silver metallic basecoat compositions containing the passivators A14 to A17, respectively of Table 15. For each of the basecoat compositions of Examples BC14 to BC17, aluminum pigment slurry, Premix A14-17, respectively, first was prepared as described below from the following ingredients. Amounts listed below are in parts by weight (grams). The Premix A14-17 components were admixed under agitation, and the admixture was allowed to stir for 30 minutes until well dispersed.

As shown in Table 15, Premixes 14, 16, and 17 contained known passivating materials while Premix 15 contained a passivating material of the invention. All the premixes in Table 15 have 15 weight percent passivator of the invention based on the weight percent of aluminum pigment.

TABLE 15

Premix A14-17

| Basecoat | A14 | A15 | A16 Comparative | A17 Comparative |
|---|---|---|---|---|
| DPM Glycol Ether | 56 | 56 | 56 | 56 |
| Polypropylene Glycol | 57 | 57 | 57 | 57 |
| TINUVIN 1130 | 16 | 16 | 16 | 16 |
| Aluminum Paste | 94 | 94 | 94 | 94 |
| Aluminum Passivator | | | | |
| Lubrizol 2062 | 25 | — | — | — |
| PE 2[4] | — | 33 | — | — |
| Comparative passivator #1[1] | — | — | 17 | — |
| Comparative passivator #2[2] | — | — | — | 24 |
| Nitroethane[3] | — | — | — | 8 |
| Phosphatized epoxy | 4 | 4 | 4 | 4 |

[1]passivating material described in Example 2 of U.S. Pat. No. 5,389,139.
[2]passivating material described in Example 1 of U.S. Pat. No. 5,215,579.
[3]from Aldrich Chemical Co.
[4]PE = Polymer of Example

Aqueous Basecoat Compositions

The Premixes A11 to A14 were used to prepare aqueous basecoat compositions (Examples BC14 to BC17) as set forth below in Table 16. Amounts listed below are in parts by weight (grams) with 15 weight percent passivator based on the amount of aluminum pigment unless otherwise indicated.

TABLE 16

| | BC14 Comparative | BC15 | BC16 Comparative | BC17 Comparative |
|---|---|---|---|---|
| Deionized Water | 291 | 291 | 291 | 291 |
| PE-10 | 547 | 547 | 547 | 547 |
| 50% Aqueous DMEA | 10 | 10 | 10 | 10 |
| CYMEL 385[1] | 205 | 205 | 205 | 205 |
| N-butoxypropanol | 153 | 153 | 153 | 153 |
| Mineral Spirits | 23 | 23 | 23 | 23 |
| Premix A14 | 252 | — | — | — |
| Premix A15 | — | 260 | — | — |
| Premix A16 | — | — | 244 | — |
| Premix A17 | — | — | — | 259 |
| Polymer of Example 13 | 15 | 15 | 15 | 15 |
| Rheology modifier[2] | 61 | 61 | 61 | 61 |

[1]melamine resin available from Cytec Industries, Inc
[2]rheology modifier made by reacting 42.9 g of 4-methylhexahydrophthalic anhydride, 18.4 g hexahydrophthalic anhydride, and 38.7 g neopentylglycolhydoxypivalate at 200° C. then diluting with methylisobutyl ketone to a solid content of 80 percent with an acid value of 165.

Each of the aqueous basecoat compositions of Examples BC14 to BC17 was prepared by mixing the above-listed ingredients under agitation. The pH of each composition was adjusted to 8.4-8.6 using an appropriate amount of a 50% aqueous solution of DMEA. Following an equilibration period of sixteen hours at ambient conditions, the pH of each basecoat was readjusted to 8.4-8.6 using an appropriate amount of a 50% aqueous solution of DMEA. The viscosity of each of the compositions then was reduced to 24 to 26 seconds spray viscosity (Ford #4 cup) using deionized water. The samples were then placed into the gassing test as described below.

Gassing Evaluation

Each of the aqueous basecoat compositions of Examples BC14 to BC17 was evaluated according to a test method that measures the amount of gas evolved from an aluminum flake-containing waterborne coating. This test method is used to determine the effectiveness of aluminum flake passivators (i.e., gassing inhibitors) in stopping or inhibiting the reaction between the aluminum pigment surface and water, which generates hydrogen gas and heat. The method involves loading an aluminum flake-containing waterborne paint into a gassing experiment apparatus that measures the amount of gas evolved in ml of gas per 250 gram of paint over 7 days.

Following the final pH and viscosity adjustments described above, 250 grams of each basecoat was placed into a gassing bottle and placed in a waterbath of 40° C. Each sample was placed into the waterbath as quickly as possible to after it was reduced to capture all possible gassing. The results are set forth in Table 17.

TABLE 17

| Basecoat | Gassing Evolved in mL |
|---|---|
| BC14* | 24 |
| BC 15 | 11.9 |
| BC 16* | 44.2 |
| BC 17* | 17.4 |

*comparative examples

From the results shown in Table 17, the passivating material of the invention provided improved gassing properties compared to the other known passivating materials.

Example 2

This Example illustrates the effect of a passivating material of the invention on the appearance characteristics of a coated article.

The coating compositions B15 and B18-20 were evaluated for various appearance characteristics as set forth in Table 18 below. B18, B19, and B20 are the same as B14, B16, and B17, respectively, but have 20 weight percent passivator instead of 15 weight percent passivator.

TABLE 18

| | B18 | B15 | B19 | B20 |
|---|---|---|---|---|
| Wt. % passivator | 20 | 15 | 20 | 20 |
| Flip/Flop[1] | 1.54 | 1.52 | 1.44 | 1.46 |
| L15[2] | 132.08 | 131.13 | 126.91 | 126.49 |
| CO[3] | 49 | 51 | 30 | 52 |
| Gassing[4] ± 5 ml | <5 | <5 | 33.7 | <5 |

[1]calculated by obtaining L15, L45, and L110 values using an X-RITE spectrophotometer and calculating flip/flop from these values. The larger the flip/flop value, the brighter L15 and the darker L110 values are.
[2]brightness measured at 15° using an X-RITE Spectrophotometer. The higher the value the more brilliant the color.
[3]Autospec = combined average of gloss, distinctness of image, and orange peel determined using a conventional Autospec Quality Measurement System (ASTM 0631).
[4]gassing less than 10 ml is considered acceptable It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A passivating material suitable for passivating a metal surface, the passivating material comprising:
 a polymer comprising or derived from a polyester polymer, a glycidyl group containing polymer, copolymers thereof, or mixtures thereof, the polymer further comprising:
 (a) at least one nitro group; and
 (b) an organic ester of phosphoric acid or an organic ester of phosphorous acid.

2. The passivating material of claim 1, wherein the polymer comprises or is derived from a glycidyl group containing polymer.

3. The passivating material of claim 1, wherein the polymer is derived from a reaction product of reactants comprising a glycidyl ether of an aromatic alcohol.

4. The passivating material of claim 1, wherein the polymer is derived from the reaction product of reactants comprising a polyglycidyl ether of a polyhydric alcohol.

5. The passivating material of claim 1, wherein the polymer comprises or is derived from an acrylic polymer with glycidyl functionality.

6. The passivating material of claim 1, wherein the nitro group is derived from at least one of an alkyl, an aryl, and/or an alkyl aryl nitro group-containing compound.

7. The passivating material of claim 1, wherein the nitro group is derived from an aromatic nitro group-containing compound selected from 2-nitrobenzoic acid, 4-nitrobenzoic acid, 2-4-dinitrobenzoic acid, and mixtures thereof.

8. The passivating material of claim 1, wherein the nitro group is derived from 4-nitrobenzoic acid.

9. A passivating material suitable for passivating a metal surface, the passivating material comprising:
 a polymer comprising:
 (a) at least one nitro group; and
 (b) an organic ester of phosphoric acid or an organic ester of phosphorous acid;
 wherein the polymer comprises the reaction product of reactants comprising an aromatic epoxy group-containing compound, an aromatic nitro compound; and a phosphorous-containing compound.

10. A passivating material suitable for passivating a metal surface, the passivating material comprising:
 a polymer comprising:
 (a) at least one nitro group; and
 (b) an organic ester of phosphoric acid or an organic ester of phosphorous acid;
 wherein the polymer comprises the reaction product of:
 a diglycidyl ether of a polyhydric aromatic alcohol;
 a nitro compound selected from the group consisting of 2-nitrobenzoic acid, 4-nitrobenzoic acid, 2-4-dinitrobenzoic acid, and mixtures thereof; and
 a phosphorous-containing compound selected from the group of phosphoric acid, an alkyl, an aryl, and/or an alkyl aryl phosphonic acid, and mixtures thereof.

11. The passivating material of claim 10, wherein the polymer has an equivalent ratio of epoxy:nitro group:phosphoric acid of 3.8/0.3/4.8 to 3.8/3/0.8.

12. The passivating material of claim 10, wherein the polymer has an equivalent ratio of epoxy:nitro group:phosphoric acid of 3.8/0.8/4.2 to 3.8/1/3.2.

* * * * *